(12) United States Patent
Kogane et al.

(10) Patent No.: US 7,151,558 B1
(45) Date of Patent: Dec. 19, 2006

(54) MONITOR CAMERA SYSTEM AND AUTO-TRACING IMPLEMENTATION METHOD USING THE SAME

(75) Inventors: Haruo Kogane, Kawasaki (JP);
Kazutaka Higuchi, Yokohama (JP);
Kazushige Tamura, Sagamihara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 619 days.

(21) Appl. No.: 09/649,174

(22) Filed: Aug. 29, 2000

(30) Foreign Application Priority Data

Aug. 31, 1999 (JP) ............................. 11-246200

(51) Int. Cl.
*A47G 23/02* (2006.01)
(52) U.S. Cl. .................................. 348/151
(58) Field of Classification Search ............. 348/143, 348/139, 142, 151, 169, 170, 15, 211.1, 52, 348/211.99, 211.4, 211.14, 211.6, 159, 152, 348/14.04; 356/139.06; 380/28; 345/723; 709/323; *H04N 7/18; A47G 23/02*
See application file for complete search history.

(56) References Cited

U.S. PATENT DOCUMENTS

| | | | |
|---|---|---|---|
| 4,945,367 A | 7/1990 | Bkackshear | |
| 5,111,288 A * | 5/1992 | Blackshear | 348/143 |
| 5,570,177 A * | 10/1996 | Parker et al. | 356/139.06 |
| 5,572,317 A * | 11/1996 | Parker et al. | 356/139.06 |
| 5,745,167 A * | 4/1998 | Kageyu et al. | 348/153 |
| 5,874,990 A * | 2/1999 | Kato | 348/139 |
| 5,897,216 A * | 4/1999 | Furuyama | 386/52 |
| 6,067,571 A * | 5/2000 | Igarashi et al. | 709/232 |
| 6,239,836 B1* | 5/2001 | Suzuki et al. | 348/211.3 |
| 6,452,612 B1* | 9/2002 | Holtz et al. | 715/723 |
| 6,525,761 B1* | 2/2003 | Sato et al. | 348/14.04 |
| 6,680,746 B1* | 1/2004 | Kawai et al. | 348/211.9 |
| 6,714,236 B1* | 3/2004 | Wada et al. | 348/152 |

FOREIGN PATENT DOCUMENTS

| | | | |
|---|---|---|---|
| EP | 1081954 A2 * | 3/2001 | |
| JP | 11-150675 | 6/1999 | |
| JP | 11-234659 | 11/1999 | |
| WO | WO95 15542 | 6/1995 | |

\* cited by examiner

*Primary Examiner*—Tung Vo
(74) *Attorney, Agent, or Firm*—McDermott Will & Emery LLP (57) ABSTRACT

In a monitor camera system comprising a monitor camera rotatable through 360 degrees in panning directions and through 90 degrees or more in tilting directions and a control unit for controlling the monitor camera, the monitor camera holds an auto-tracing record including a command sent from the control unit and a time stamp indicative of a reception point of the command on a time base in auto-tracing learning, and reads out the auto-tracing record at implementation of auto-tracing to execute the command in the auto-tracing record at the corresponding point on the time base. With the configuration of the monitor camera system, the monitor camera is made to retain the commands for the auto-tracing implementation, which can prevent a delay of the operation of the monitor camera stemming from a delay in control data transmission.

18 Claims, 9 Drawing Sheets

ID=0001

| TIME STAMP | COMMAND |
|---|---|
| 00000000 | COMMAND Vpan=p1, Vtilt=t1 |
| 00000015 | COMMAND Vpan=0, Vtilt=0 |
| 00000020 | COMMAND Z=z1 |
| 00000026 | COMMAND F=f1 |
| 00000125 | COMMAND Vpan=p2, Vtilt=t2 |
| 00000215 | COMMAND Vpan=0, Vtilt=0 |
| 00000220 | COMMAND Z=z2 |
| 00000226 | COMMAND F=f2 |
| : | : |
| : | : |

| TIME STAMP | COMMAND |
|---|---|
| 00000000 | COMMAND Vpan=p1, Vtilt=t1 |
| 00000015 | COMMAND Vpan=0, Vtilt=0 |
| 00000020 | COMMAND Z=z1 |
| 00000026 | COMMAND F=f1 |
| 00000125 | COMMAND Vpan=p2, Vtilt=t2 |
| 00000215 | COMMAND Vpan=0, Vtilt=0 |
| 00000220 | COMMAND Z=z2 |
| 00000226 | COMMAND F=f2 |
| ⋮ | ⋮ |
| ⋮ | ⋮ |

FIG. 1B

| ID | HEAD ADDRESS |
|---|---|
| 0001 | a1 |
| 0002 | a2 |
| ⋮ | ⋮ |
| ⋮ | ⋮ |

PRESET POINT

| ID | PAN | TILT | ZOOM | FOCUS |
|---|---|---|---|---|
| 1 | P1 | T1 | Z1 | F1 |
| 2 | P2 | T2 | Z2 | F2 |
| 3 | P3 | T3 | Z3 | F3 |
| ⋮ | ⋮ | ⋮ | ⋮ | ⋮ |

FIG. 5

|  | PAN ROTATION ANGLE | TILT ROTATION ANGLE |
|---|---|---|
| FIRST PATH | P2−Pt | \|T2\|−\|Tt\| |
| SECOND PATH | 360−P2−Pt | \|T2\|−\|Tt\| |
| THIRD PATH | P2−(Pt+180) | \|T2\|+\|Tt\| |
| FOURTH PATH | 180−P2−Pt | \|T2\|+\|Tt\| |

MONITOR CAMERA SYSTEM AND AUTO-TRACING IMPLEMENTATION METHOD USING THE SAME

BACKGROUND OF THE INVENTION

1. Field of the Invention

The present invention relates to a monitor (surveillance) camera system covering 360-degree monitoring area and an auto-tracing method of automatically tracing (passing) monitoring points successively through the use of a monitor camera, and more particularly to a monitor camera system and an auto-tracing method which are capable of implementing the auto-tracing accurately.

2. Description of the Related Art

Figure 10:
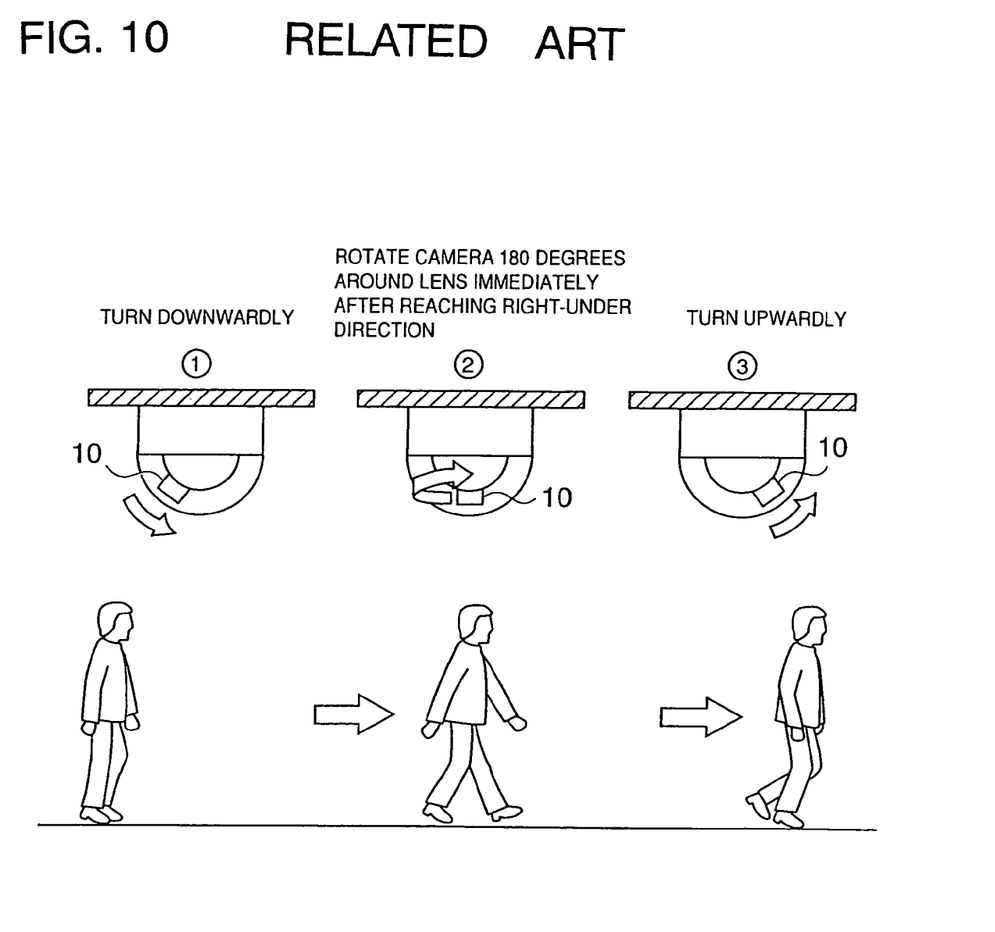
FIG. 10 is an illustration for explaining an operation of a compound camera system.

So far, a monitor camera in which a camera and a rotatable table therefor are placed in a dome-like housing has been put on the market. This monitor camera is called a "compound camera" because of the camera being capable of, through movements of the rotatable table, rotating horizontally (pan) while rotating vertically (tilt). It can rotate through 360 degrees without limitation in the pan directions, while rotating in an angular range between 0 degree and 90 degrees, that is, from a horizontal direction to a vertical direction, in the tilt directions. In addition, through the manipulation of a controller, this compound camera can take a photograph at a desired angle or in a desired direction in a state installed on a ceiling of public facilities or the like. Still additionally, even if a target subject passes right under it, as FIG. 10 shows, immediately a camera 10 turns to right under, it can rotate 180 degrees around a lens thereof to chase the target subject continuously, thus providing pictures throughout a monitoring area.

Figure 8:
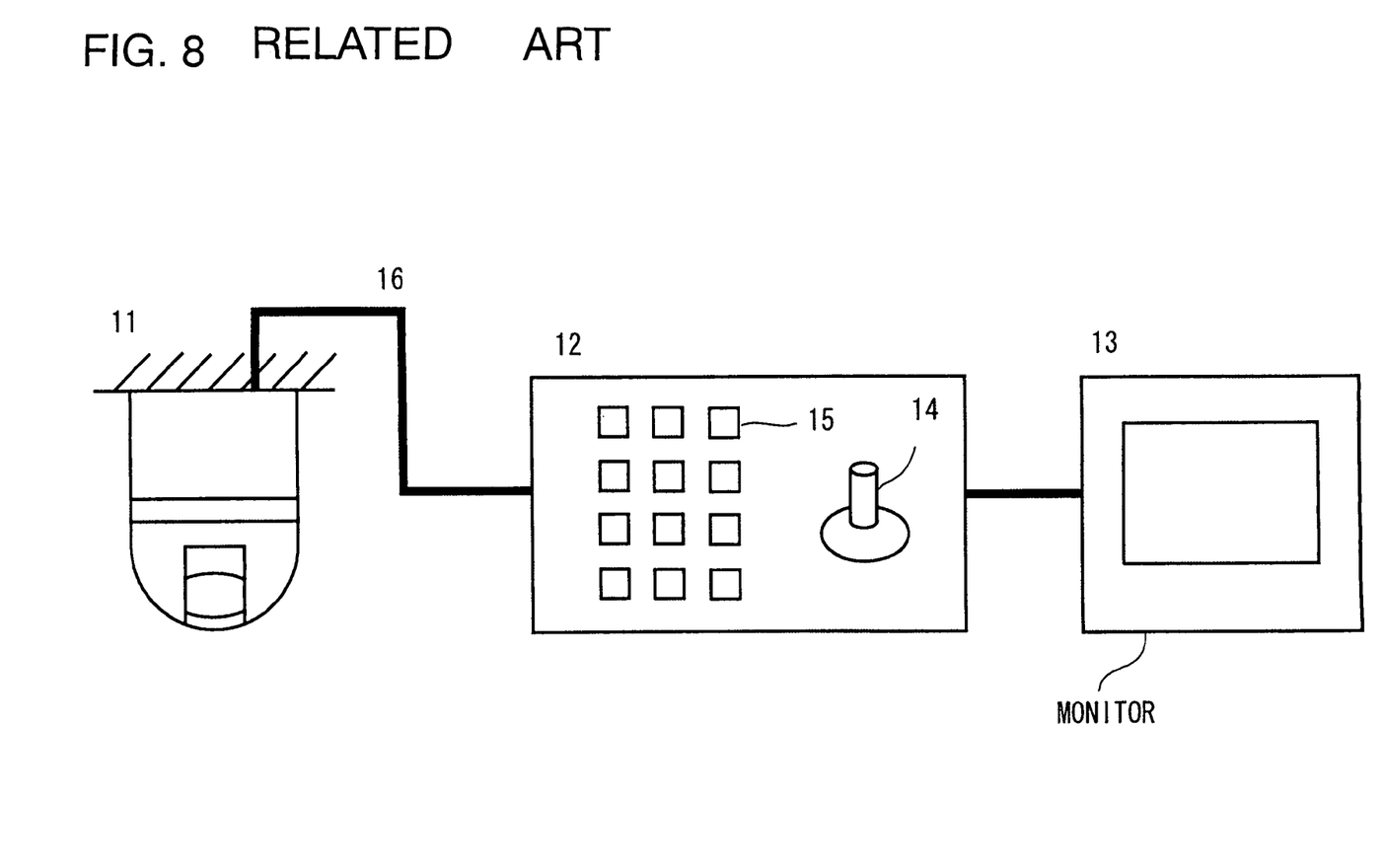
FIG. 8 is an illustration of a control system in a compound camera system.

FIG. 8 is an illustration of a state in which a controller 12 for controlling a compound camera 11 and a monitor 13 for displaying a picture taken through the compound camera 11 are connected through a coaxial cable 16 to the compound camera 11. The controller 12 functions as a control element and comprises a joystick 14 and a numeric pad (numeric keys) 15.

This compound camera 11 is designed so that a plurality of camera positions, for example, taking a direction to an entrance, a direction to an exit and a direction to a window, are preset in the controller 12 in the form of identification numbers (ID). After preset, simply by inputting the ID corresponding to a camera position through the use of the numeric pad 15, the camera can be turned to take the preset direction.

Figure 9:
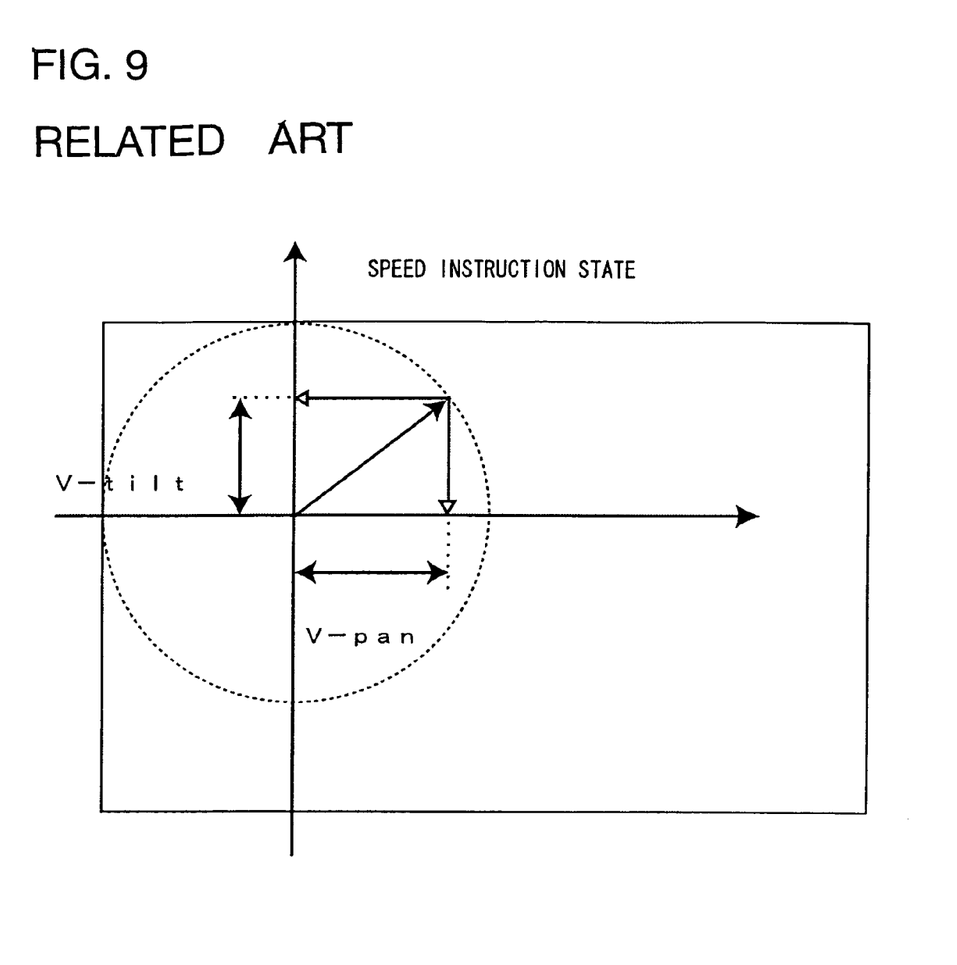
FIG. 9 is an illustration for explaining camera speed control in a compound camera system.

In addition, the joystick 14 of the controller 12 is manipulated for controlling the moving (rotating) speed of the camera 11. When the joystick 14 is tilted, as shown in FIG. 9, the camera 11 rotates in a tilting direction at a speed proportional to the movement component of the joystick 14 in the vertical-axis direction and rotates in a panning direction at a speed proportional to the movement component thereof in the horizontal-axis direction. An operator checks pictures while viewing the monitor 13 and, when the rotating camera 11 catches a desired direction, the operator returns the joystick 14 to the neutral position to stop the rotation thereof in the tilting and panning directions.

In addition, this monitor camera system can perform auto-tracing by making the controller 12 store a plurality of monitoring spots to be monitored by the camera 11 to display the pictures of the plurality of monitoring spots in rotation in accordance with an instruction from the controller 12.

However, according to the conventional monitor camera system, since the instruction on the monitoring spots for the auto-tracing is issued from the controller 12, a delay in arrival of instruction data at the monitor camera 11 occurs owing to transmission delay or the like, which creates a problem in that difficulty is experienced in accomplish the auto-tracing accurately as set initially.

SUMMARY OF THE INVENTION

Accordingly, the present invention has been developed with a view to eliminating this problem, and it is an object of the invention to provide a monitor camera system and an auto-tracing method for use in the monitor camera system, which are capable of accomplishing the auto-tracing accurately.

For this purpose, in accordance with an aspect of the present invention, there is provided a monitor camera system comprising a monitor camera rotatable through 360 degrees in panning directions and through 90 degrees or more in tilting directions and control means for controlling the monitor camera, the monitor camera holding an auto-tracing record including a command sent from the control means and a time stamp indicative of a reception point of the command on a time base in auto-tracing learning, and reading out the auto-tracing record at implementation of auto-tracing to execute a command in the auto-tracing record at the corresponding point on the time base.

In this monitor camera system, it is also appropriate that, at the auto-tracing implementation, the monitor camera executes commands successively in the order of lower locations in the auto-tracing record, and that data for setting a camera field angle or a camera scene is recorded at the head of the auto-tracing record, and a camera state at the start of the auto-tracing implementation is set on the basis of the setting data.

Furthermore, in the monitor camera system, it is also possible that, at the auto-tracing implementation, the monitor camera interprets the time base in a different manner from that in the auto-tracing learning to implement the auto-tracing at a speed different from that in the auto-tracing learning. Still furthermore, the monitor camera can achieve 360-degree pan rotation and 180-degree tilt rotation.

In addition, in accordance with another aspect of the present invention, there is provided an auto-tracing implementation method for use in a monitor camera system comprising a monitor camera rotatable through 360 degrees in panning directions and through 90 degrees or more in tilting directions and control means for controlling the monitor camera, the method comprising the steps of making the monitor camera put, in a memory thereof, a command sent from the control means and a time stamp indicative of a reception point of the command on a time base as an auto-tracing record in auto-tracing learning, when receiving an instruction for implementation of auto-tracing from the control means, making the monitor camera read out the auto-tracing record from the memory, and executing the command existing in the auto-tracing record at the corresponding point on the time base.

In this auto-tracing implementation method, after completion of the auto-tracing learning, the auto-tracing record stored in the memory is transferred from the monitor camera to the control means so that the control means holds the auto-tracing record, and at the auto-tracing implementation, the auto-tracing record is transferred from the control means to the memory of the monitor camera.

Furthermore, in this auto-tracing implementation method, it is also appropriate that, in the monitor camera, at the auto-tracing implementation, interpretation on the time base is made in a different manner from that in the auto-tracing learning to implement the auto-tracing at a speed different from that in the auto-tracing learning. Still furthermore, it is also appropriate that, in the monitor camera, at auto-tracing recording or in auto-tracing reproduction, data representative of an auto-tracing operation state is displayed in a state superimposed on a monitor picture taken by the monitor camera.

BRIEF DESCRIPTION OF THE DRAWINGS

Other objects and features of the present invention will become more readily apparent from the following detailed description of the preferred embodiments taken in conjunction with the accompanying drawings in which.

DETAILED DESCRIPTION OF THE INVENTION

A group including the inventors of the present invention has developed a new compound camera system capable of rotating through 180 degrees in tilting directions while limitlessly rotating through 360 degrees in panning directions. This compound camera system can increase the degree of freedom in moving direction so that a monitor camera thereof can move promptly through the shortest path up to the target camera position.

A description will be given hereinbelow of a monitor camera system according to an embodiment of the present invention, implementing auto-tracing through the use of this compound camera.

Figure 6:
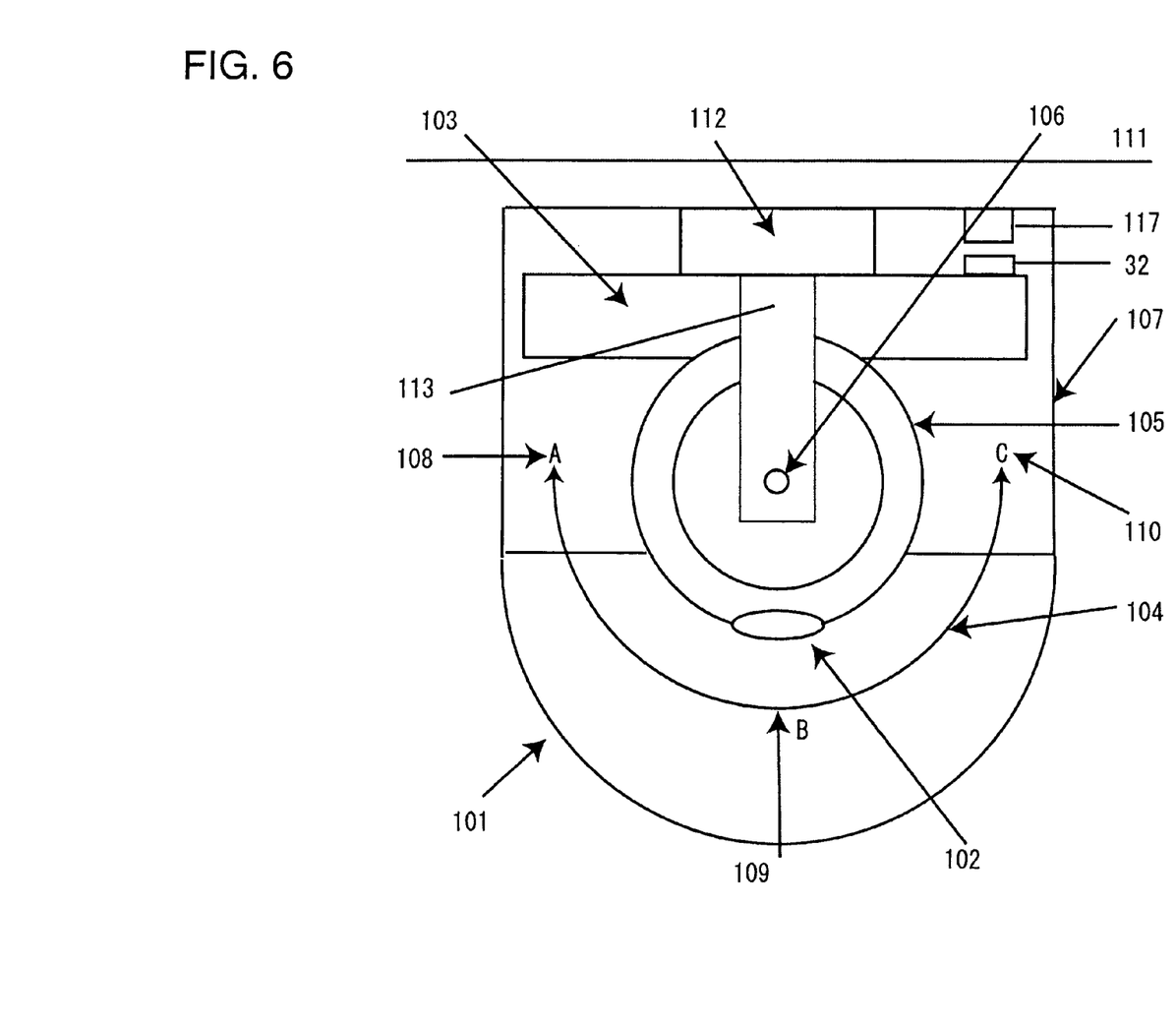
FIG. 6 is a side cross-sectional view showing a construction of a monitor camera of the compound camera system according to the embodiment.
Figure 7:
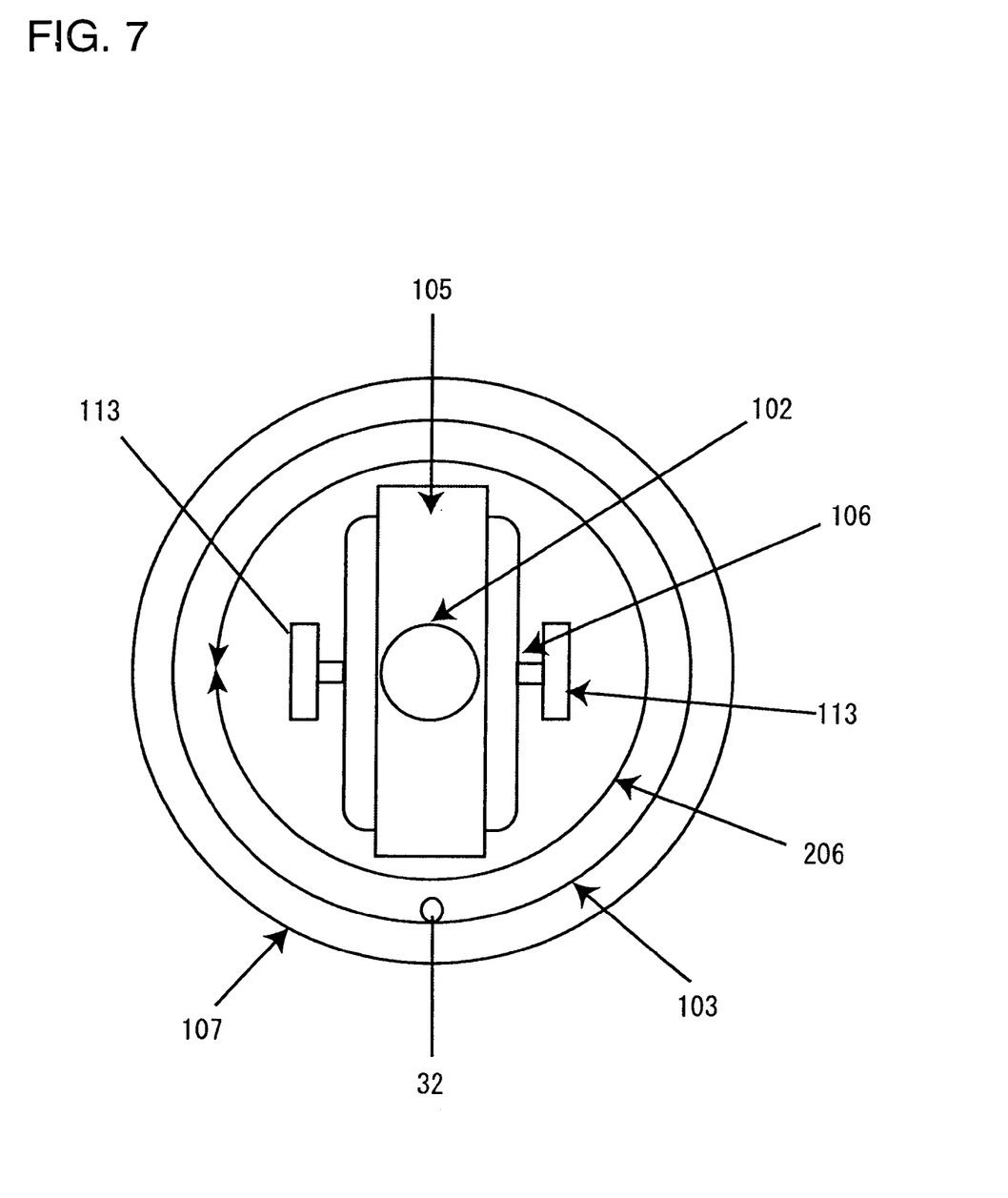
FIG. 7 is a plan cross-sectional view showing the construction of the monitor camera of the compound camera system according to the embodiment.

As the compound camera, as the side cross-sectional view of FIG. 6 and the plan view of FIG. 7 show, a housing comprising a cylindrical camera base 107 and a semi-spherical camera cover 101 accommodates a monitor camera 102, a rotatable tilt table 105 for holding the camera 102 directly, a rotatable pan table 103 capable of limitlessly rotating 360 degrees, a pair of columns 113 planted on the rotatable pan table 103, a tilt rotary shaft 106 for rotatably supporting the rotatable tilt table 105 with respect to the columns 113, and a slip ring 112 acting as a contact for supply of power into the housing or for input/output of electrical signals. Although omitted from the illustration, the compound camera is additionally equipped with a rotating mechanism for the rotatable pan table 103 and the rotatable tilt table 104, a motor functioning as a rotational drive source, a drive control section for the motor, an amplifying circuit for amplifying video signals, and a control section for controlling an operation of the compound camera system. In addition, a magnet 117 is fixed at an origin position for determining the origin of rotation in the panning direction, while a home-position (origin) Hall element 32 is placed on the rotatable pan table 103 for detecting a magnetic field from the magnet 117.

The rotatable tilt table 105, holding the camera 102, is rotatable through 180 degrees around the tilt rotary shaft 106 and, therefore, the camera 102 is reversibly rotatable from a point A (designated at numeral 108 in FIG. 6) through a lowermost point B (designated at numeral 109 in FIG. 6) to a point C (designated at numeral 110 in FIG. 6).

On the other hand, the rotatable pan table 103 is rotatable horizontally through 360 degrees as indicated by a rotation locus (designated at numeral 206 in FIG. 7).

Furthermore, the slip ring 112 realizes the supply of power from a fixed section to a moving section and the communication of electric signals between the fixed section and the moving section in the compound camera system.

Accordingly, when this compound camera is installed, for example, on a ceiling 111, the camera 102 takes a photograph on a monitoring area in all directions in a manner that the angle of rotation of the rotatable tilt table 105 is controlled remotely and the rotatable pan table 103 is rotated in a predetermined direction.

Figure 3:
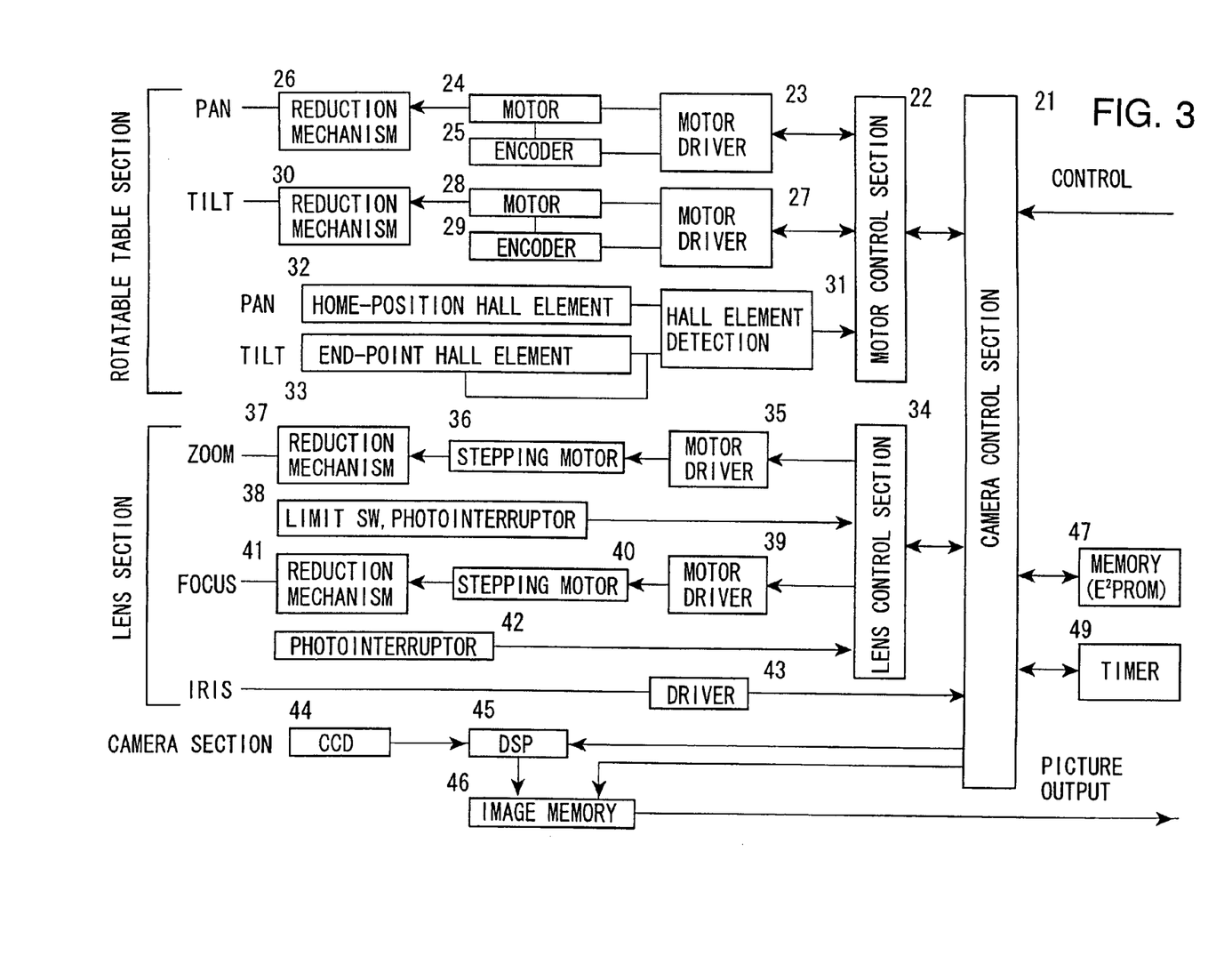
FIG. 3 is a block diagram showing a configuration of the compound camera according to the embodiment.

FIG. 3 is a functional block diagram showing an internal configuration of the compound camera. As a rotation control mechanism for the rotatable pan table 103 and the rotatable tilt table 105, there are provided motors 24, 28, encoders 25, 29 for detecting speeds of rotation (revolutions) of the motors 24, 28 motor drivers 23, 27 for driving the motors 24, 28 on the basis of the detection results of the encoders 25, 29, reduction mechanisms 26, 30 for reducing the rotation of the motors 24, 28 to transmit the reduced rotation to the rotatable pan table 103 and the rotatable tilt table 105, respectively, an origin Hall element 32 placed on the rotatable pan table 103 and sensitive to a magnetic field of the magnet 117 situated at the pan origin, end-point Hall elements 33 located 180 degrees apart on the rotatable tilt table 105 and sensitive to magnetic fields of magnets placed at tilt end-point positions, a Hall element signal detecting section 31 for detecting the pan origin and the tilt end points on the basis of detection signals from the Hall elements 32, 33, and a motor control section 22 for controlling the motor drivers 23, 27 in accordance with the detection results of the Hall element detecting section 31.

In addition, as a control mechanism for a camera lens section, there are provided stepping (stepper) motors 36, 40 for zoom and focus adjustments, motor drivers 35, 39 for outputting drive pulses to the stepping motors 36, 40, respectively, reduction mechanisms 37, 41 for reducing the rotation of the stepping motors 36, 40 to transmit the reduced rotation to lens mechanisms, respectively, a limit switch (or photointerruptor) 38 for detecting the limit of the zoom adjustment, a photointerruptor 42 for detecting the limit of the focus adjustment, a lens control section 34 for controlling the motor drivers 35, 39, and a driver 43 for adjusting the iris.

Still additionally, a camera section, outputting a video signal, is composed of an image pickup device (CCD) 44, a DSP 45 for encoding a video signal, and an image memory 46 in and from which image data is writable and readable.

Moreover, in the compound camera system, are included a camera control section 21 for controlling an operation of the compound camera system in accordance with a control signal from a controller (not shown), a memory ($E^2PROM$) 47 for storing data, and a timer 49 for counting (measuring) time.

Still moreover, for example, the compound camera can be controlled in a state connected through a coaxial cable 16 to a controller 12 and a monitor 13 as well as the system shown in FIG. 8.

In the illustration, although one compound camera 11 is connected to the controller 12, it is also possible that a plurality of compound cameras are connected to the controller 12 to be controlled by the controller 12.

In this compound camera, the output pulses of the encoder 25 for detecting the rotation of the motor 24 in a panning direction is sent to the motor control section 22, and a point of time at which the home-position element 32 has detected the pan origin is communicated through the Hall element signal detecting section 31 to the motor control section 22. When the number of pulses to be outputted from the encoder 25 while the rotatable pan table 103 makes one revolution (during one revolution of rotatable pan table 103) is taken as p, the motor control section 22 counts the number m of output pulses of the encoder 25 from when the Hall element 32 has detected the pan origin to calculate the present pan angle Pt according to the following equation. The present pan angle Pt calculated thus is preserved in the memory 47.

$Pt = m \times 360/p$

Likewise, the output pulses of the encoder 29 which detects the rotation of the motor 28 in a tilt direction are forwarded to the motor control section 22, and the point of time at which the tilt end point has been detected by the end-point Hall element 33 is communicated through the Hall element signal detecting section, 31 to the motor control section 22. When the number of pulses to be outputted from the encoder 29 while the rotatable tilt table 105 makes half a revolution (during half revolution of rotatable tilt table 105) is taken as q, the motor control section 22 counts the number n of output pulses of the encoder 29 from when the end-point Hall element 33 has detected a tilt end point, and calculates the present tilt angle Tt according to the following equation.

$Tt = 90 - (n \times 180/q)$

That is, the tilt angle is taken as 0 when the camera 102 face downwardly (right under) and the tilt angle is calculated with respect to the right-downward direction. The possible tilt angle ranges from +90 degrees to −90 degrees. The present tilt angle Tt calculated is retained in the memory 47.

Furthermore, the field angle of a picture to be photographed by the lens section depends upon the rotating quantity of the stepping motor 36 determining the zooming quantity, while the rotating quantity thereof depends upon the number of pulses to be outputted to the stepping motor 36. Likewise, the focal length depends upon the number of pulses to be outputted to the stepping motor 40. When counting a pulse for rotating each of the stepping motors 36 and 46, the lens control section 34 counts it as "plus" when each of the stepping motors 36 and 46 is rotated forwardly, while counting it as "minus" when each of the stepping motors 36 and 46 is rotated reversely, thus cumulatively calculating the number of pulses outputted from each of the motor drivers 35 and 39. These numbers of pulses cumulatively calculated are retained in the memory 47 as data representative of the present field angle Zt and the focal length Ft.

In this way, the values Pt, Tt, Zt and Ft are preserved in the memory 47 as data representative of the present quantity of state of the compound camera.

In controlling an operation of this compound camera 11, a command shown in FIG. 8 is transmitted. The camera control section 21 of the compound camera 11 receives and interprets the command to control each of portions thereof.

For example, for the setting of a preset point, an operator remotely controls the camera direction through the controller 12 so that the camera position of the compound camera 11 faces a target preset point.

When an operator inclines the joystick 14 of the controller 12 for changing the camera facing direction, in response to this manipulation, the controller 12 sends a command for camera moving speed control to the compound camera system 11 and transmits data Vpan indicative of an x-axis component of the inclination of the joystick 14 and data Vtilt indicative of a y-axis component thereof, shown in FIG. 9, to the compound camera 11. In the compound camera 11, the camera control section 21 interprets the received command, and sends the data Vpan and the data Vtilt to the motor control section 22. The motor control section 22 controls the motor driver 23 so that the camera panning rotation is made at a speed corresponding to the data Vpan and further controls the motor driver 27 so that the camera tilting rotation is made at a speed corresponding to the data Vtilt.

When the operator returns the joystick 14 to the neutral position, the controller 12 similarly sends a command and data representative of Vpan=0 and Vtilt=0 to the compound camera 11, thereby ceasing the camera rotation in the tilting direction and in the panning direction.

At a change of the camera direction, the data Pt, Tt, Zt and Ft representative of the present quantity of state, as mentioned above, are preserved after updated.

When confirming that the compound camera 11 has turned toward a target, the operator remotely controls the zooming quantity as occasion demands, and then inputs a preset instruction and an ID (identification Number or the like) of the preset point through the controller 12 or a personal computer 19. A preset instruction command including this ID is sent to the compound camera 11, and the camera control section 21 interprets that command and stores the data Pt, Tt, Zt and Ft indicative of the present quantities of state of the compound camera 11 together with the ID in the memory 47.

Figure 4:
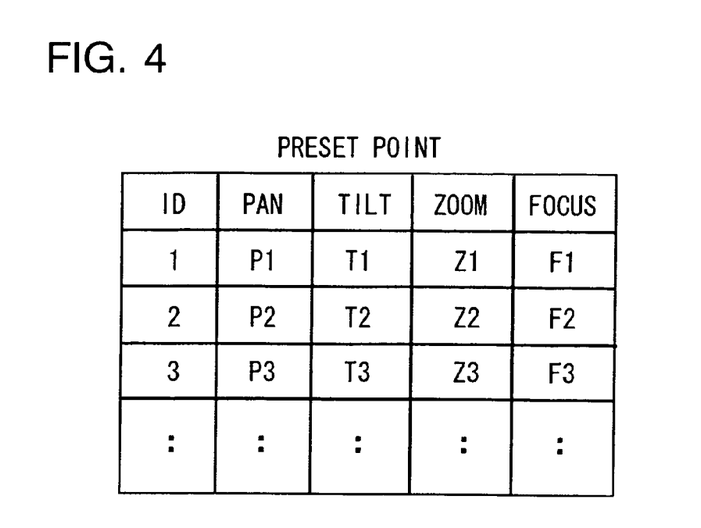
FIG. 4 is an illustration of data representative of preset state quantities to be stored in the compound camera system.

Through the repetition of this operation, in the memory 47, a plurality of preset points are set as shown in FIG. 4.

Secondly, when the operator designates the ID (for example, ID=2) of a preset point through the use of the controller 12 or the personal computer 19 to give an instruction for photographing that preset point, the camera control section 21 of the compound camera 11 interprets the received command and reads out the state quantities P2, T2, Z2 and F2 of the preset points corresponding to the ID=2 and the present state quantities Pt, Tt, Zt and Ft from the memory 47 to obtain the shortest path from the present camera position to the preset point of ID=2.

Possible moving paths from the present camera position to the preset point of ID=2 are:

1. a path through which the preset point is reached due to right-turning pan rotation and tilt rotation within the same region (that is, when the present tilt angle is in the positive region, the tilt rotation takes place in the positive region, while, if the present tilt angle is in the negative region, it takes place in the negative region);

2. a path to the preset point due to left-turning pan rotation and tilt rotation in the same region;

3. a path to the preset point due to tilt rotation for shifting into a different region (tilt rotation causing passing through the tilt angle of zero degree and shifting from the positive region to the negative region or from the negative region to the positive region) and right-turning pan rotation; and 4. a path to the preset point due to tilt rotation into a different region and left-turning pan rotation.

Figure 5:
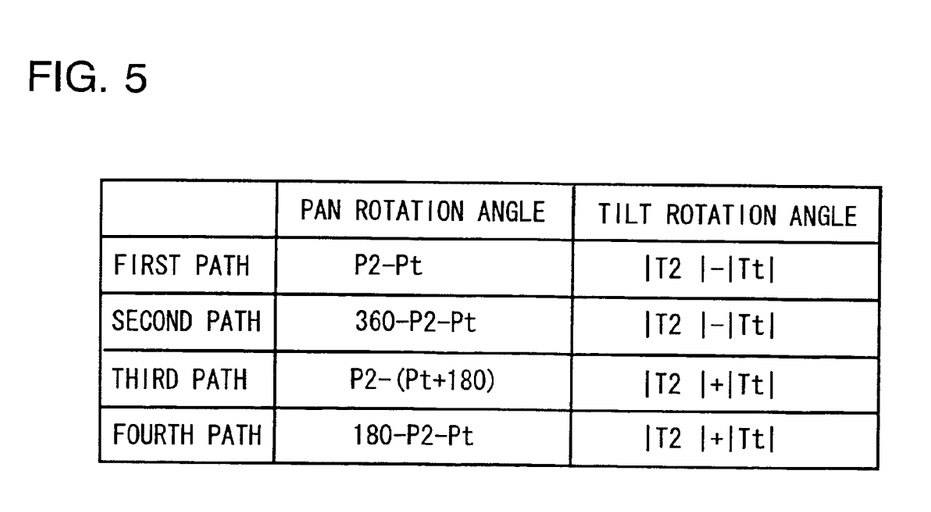
FIG. 5 is an illustration of data representative of pan rotation angles and tilt rotation angles in paths or routes to be calculated for obtaining the optimum path in the compound camera according to the embodiment.

For each of the moving paths, the pan rotation angle and the tilt rotation angle are as shown in FIG. 5. In the compound camera 11, the camera control section 21 takes note of the larger one of the pan rotation angle and the tilt rotation angle for each of the moving paths, and selects, as the shortest path, the moving path taking the smallest rotation angle. This is because, in a case in which the rotation in a panning direction and the rotation in a tilting direction are made concurrently for the shifting to the target preset point, the time taken for the arrival at the preset point depends upon the larger one of the pan rotation angle and the tilt rotation angle.

On the selection of the shortest path, the camera control section 21 give an instruction to the motor control section 22 so that the pan rotation and tilt rotation take place according to the pan and tilt rotation angles for the selected moving path, and further gives an instruction to the lens control section 34 for the output of a pulse (Z2-Zt) to the zoom stepping motor 36 and for the output of a pulse (F2-Ft) to the stepping motor 40.

The motor driver 23 makes the motor 24 rotate by the pan rotation angle designated through the motor control section 22, and when detecting, on the basis of the output of the encoder 25, the fact that the motor 24 has rotated by the designated angle, ceases the rotation of the motor 24. Likewise, the motor driver 27 makes the motor 28 rotate by the tilt rotation angle designated through the motor control section 22, and when detecting, on the basis of the output of the encoder 29, the fact that the motor 28 has rotated by the designated angle, ceases the rotation of the motor 28. In consequence, the camera faces the position of the preset point ID=2 so that the photographing starts in the lens condition at the presetting. Incidentally, the adjustment of iris is accomplished by starting the driver 43 in accordance with the brightness of the subject at that time.

The CCD 44 takes a picture in the camera facing direction, and the resultant video signal is encoded by the DSP 45 and then written in the image memory 46. Thereafter, the video signal is read out from the image memory 46 to be outputted to the monitor 13.

At this time, in the selected shortest path, when the tilt rotation passes through zero degree and enters a different region (that is, in the case of the selection of the third or fourth moving path), the readout of the image data from the image memory 46 is conducted in the reverse order. This can prevent the reversal of the image to be displayed on the monitor 13.

Furthermore, it is also appropriate that two points other than a tilt angle of zero are set as the points (camera directions) at which the image data readout direction is switched actually so that the image data readout direction is switched in a case in which the tile angle passes through one of these two points and advances to the minus side while the switching of the image data readout direction is canceled in a case in which the tilt angle passes through the other point and advances to the plus side. Thus, when the switching of the image data readout direction shows a hysteresis, frequent occurrence of image reversal in the vicinity of the switching points is preventable.

Moreover, a description will be given hereinbelow of an auto-tracing operation in the monitor camera system according to the embodiment of the present invention.

When an operator gives an instruction for the start of auto-tracing learning through the use of the controller 12, upon receipt of this instruction, the camera control section 21 of the compound camera 11 starts the timer 49 and puts subsequent input commands, together with a time stamp (indicative of a command reception point on a time base) of the timer 49, in the memory 47.

Figure 2:
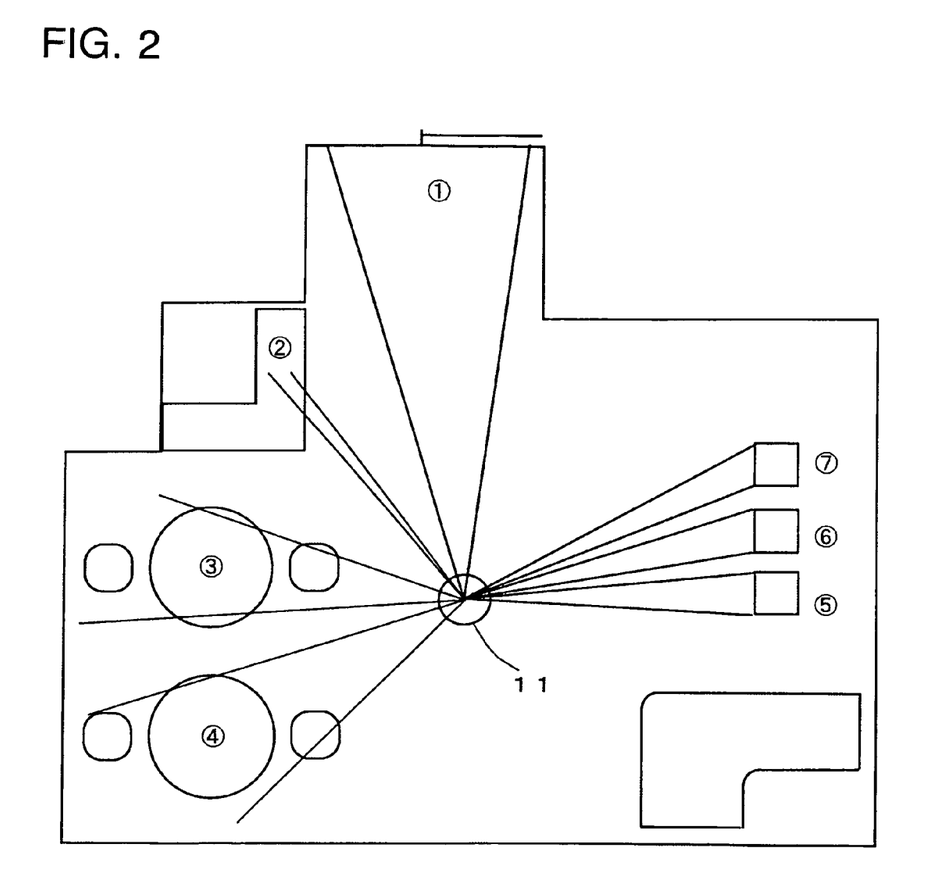
FIG. 2 is an illustration useful for explaining an auto-tracing learning operation in the compound camera system according to the embodiment.

For example, the operator inputs the ID (for instance, ID=0001) indicative of the auto-tracing and then, as FIG. 2 shows, controls the pan and tilt rotation to take a picture in the direction denoted at the circled numeral 1 and controls the zooming quantity and the focusing. Following this, after observing this picture for predetermined period of time, the operators makes the camera follow the direction denoted at the circled numeral 2 to adjust the zoom and focus. After also conducting such an operation on the monitoring points represented at the circled numerals 3, 4, 5, 6 and 7, the operator inputs a learning end instruction representative of the completion of the learning through the use of the controller 12.

Figure 1A:
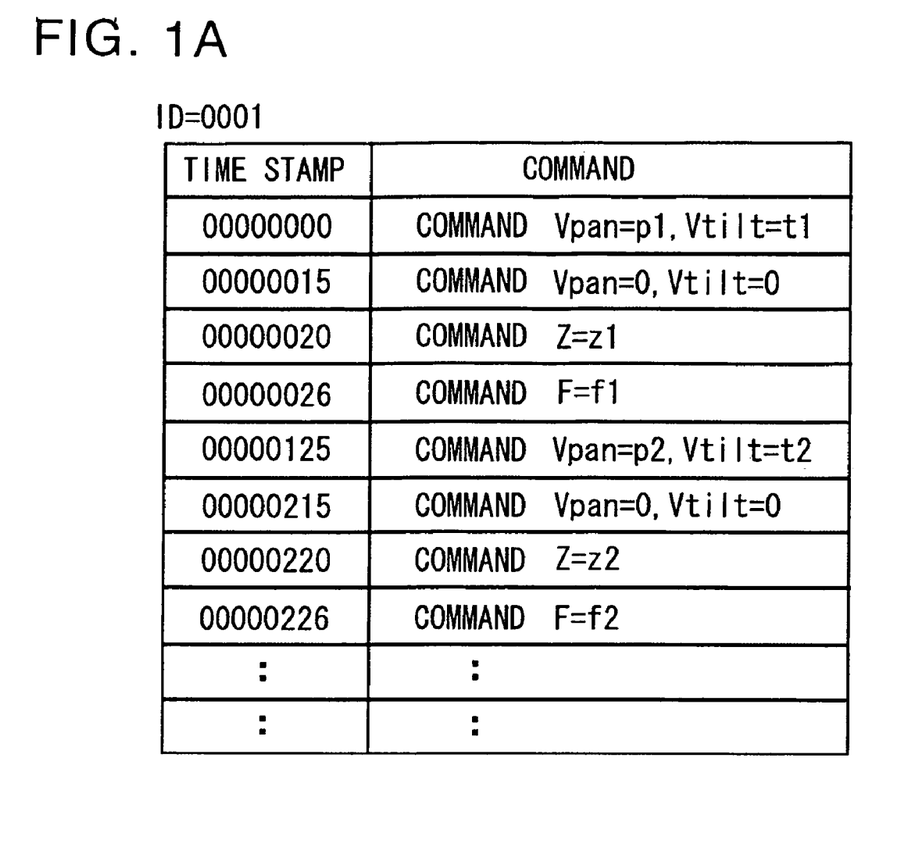
FIG. 1A is an illustration of an example of auto-tracing record of a compound (monitor) camera system according to an embodiment of the present invention.
Figure 1B:
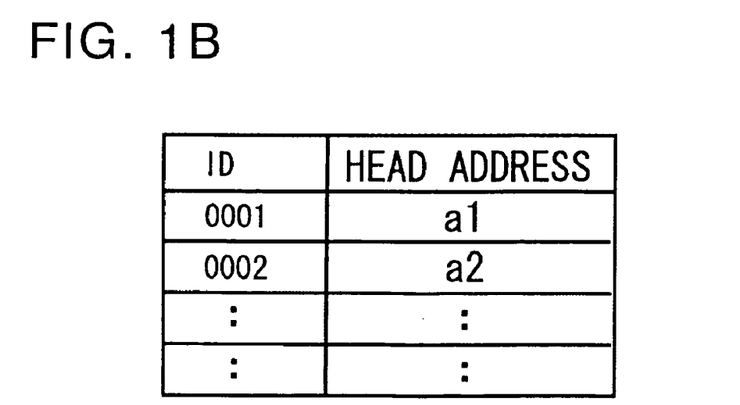
FIG. 1B is an illustration of an example of a position table in the compound camera system according to the embodiment.

In this learning, as shown in FIG. 1A, each of the rotatable table or lens operation commands fed from the controller 12 or each of the preset instruction commands, together with a time stamp, is stored in order in the memory 47 as an auto-tracing record of ID=0001. In addition, as shown in FIG. 1B, the head (first) address of this auto-tracing record is written in a position table.

Secondly, when implementing the auto-tracing, through the use of the controller 12, the operator designates an ID and inputs an instruction for the start of the auto-tracing.

In response to this instruction, in the compound camera 11, the camera control section 21 starts the timer 49 and retrieves the head address of the designated ID from the position table to successively read out the commands and time stamps from the corresponding auto-tracing record. Furthermore, it executes the recorded commands according to the time measured by the timer 49.

When the auto-tracing record is reproduced to the time of the timer 49, the compound camera 11 can conduct the monitoring operation according to the learning.

Furthermore, if, through the use of the controller 12, the operator gives an instruction for implementing auto-tracing at half the speed in the learning, in the compound camera 11 the camera control section 21 interprets the count value of the timer 49 as ½ (reduce to half) and executes the commands in the auto-tracing record. This can reproduce the auto-tracing during twice the time taken in the learning.

Likewise, if the commands in the auto-tracing record are executed in a state where the count value of the timer 49 is interpreted as twice, the auto-tracing is achievable in half the time in the learning, that is, double speed.

In this way, in a manner that the camera control section 21 changes the interpretation on the time base, the auto-tracing at the learning is reproducible at an arbitrary speed.

In addition, in the course of the auto-tracing recording or the auto-tracing reproduction, the characters (letters) "on record" or "on reproduction" can be displayed on the monitor 13 in a state superimposed on a picture taken by the compound camera 11. In this case, a character generator is provided in the compound camera 11, and the camera control section 21 controls characters or figures to be outputted from this character generator. The data such as characters or figures outputted from the character generator are inputted to the DSP 45 which in turn, superimposes the characters or figures from the character generator on an image inputted from the CCD 44 and encodes them into image data, with this image data being put in the image memory 46 and then read out therefrom to be forwarded to the monitor 13.

The camera control section 21 designates a character code and controls the character generator so that the character data "in record" or "in reproduction" is outputted from the character generator in the middle of the auto-tracing recording or the auto-tracing reproduction. Thus, a monitor picture on which the character data "in record" or "in reproduction" is superimposed can be displayed on the monitor 13.

According to this auto-tracing method, since a compound camera 11 itself retains the commands for giving instructions on operations of the rotatable tables and lens thereof, unlike a case in which a quantity of state of a compound camera is remotely controlled by a control element, not only there is no possibility that a delay of an instruction stemming from transmission occurs, but also the state in the learning is faithfully reproducible, and even a state according to variation of reproduction speed is reproducible accurately.

In addition, with this auto-tracing method, since a compound camera 11 undergoing the learning performs the auto-tracing on the basis of the record in that learning, even if that compound camera has a peculiar property (difference in property or the like), the operation in the learning is equally repeatable (for example, even if the counting intervals of timers of compound cameras differ from each other, the operation of each of the compound cameras can be conducted in the same way). Contrary to this, in the case of a type of the compound camera state quantity being remotely controlled from a control element, the differences in property among the compound cameras can create a significant problem in that the monitoring operation becomes different according to compound camera.

Moreover, in this compound camera 11, in implementing the auto-tracing, the return to the head of the auto-tracing record always takes place and the reproduction starts thereat. Accordingly, the arrival positions of the compound camera 11 coincide with those in the learning at all times.

In the above description, although the memory 47 of the compound camera 11 continuously holds the auto-tracing record in the learning, it is also appropriate that the auto-tracing record stored in the compound camera 11 is transferred to the controller 12 after the completion of the learning to be retained therein and, at the implementation of the auto-tracing, for example, in the case of implementing the auto-tracing corresponding to ID=0001, all the record about the ID=0001 auto-tracing are transferred to the memory 47 of the compound camera 11.

Also in this case, the compound camera 11 itself undergoing the learning holds the respective auto-tracing commands at the implementation of the auto-tracing, which can eliminate the aforesaid command transmission delay or the influence of the difference peculiar to that compound camera.

In addition, this method can reduce the need for the memory capacity in the compound camera 11. Still additionally, even if a memory used is of a type in which the stored data is erased when the power supply to the compound camera 11 is turned off, it is possible to implement the auto-tracing.

Furthermore, although the controller 12 is used for the control of the compound camera 11, it is also possible to employ a personal computer or the like in place of the controller 12.

As described above, the monitor camera system and auto-tracing implementing method according to the present invention can faithfully perform the monitoring operation in the learning repeatedly without receiving the influence of the transmission delay or the difference in property among devices. Additionally, the monitoring operation conducted for the learning can be implemented at an arbitrary speed.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A monitor camera system comprising:
   a monitor camera rotatable in panning directions and in tilting directions and having control means, a timer and a memory; and
   a controller, disposed outside said monitor camera, for controlling said monitor camera, wherein
   said control means of the monitor camera receives a first instruction from said controller,
   said control means starts the timer on a first time base in response to the first instruction,
   said controller receives a command and sends the command and a time stamp indicative of a reception time of the command on the first time base to the control means of the monitor camera,
   said control means holds an auto-tracing record including the command and the time stamp sent from said controller in the memory in auto-tracing learning,
   said control means receives a second instruction from said controller,
   said control means again starts the timer on a second time base in response to the second instruction, starts auto-tracing implementation in response to the second instruction, reads out the auto-tracing record from the memory without control of said controller, and executes the command of said auto-tracing record in the auto-tracing implementation at an executing time of the second time base corresponding to the reception time indicated by the time stamp of the auto-tracing record to cause the monitor camera to conduct a monitoring operation according to the auto-tracing record without control of said controller, and
   at the auto-tracing implementation, said monitor camera interprets a constant recording speed indicated by the timer as a constant reproduction speed different from the constant recording speed by a predetermined rate to implement the auto-tracing, which is learned at the constant recording speed in the auto-tracing learning, at the constant reproduction speed in said auto-tracing implementation.

2. A monitor camera system according to claim 1, wherein said controller receives a plurality of commands one after another, and sends each of the commands and a time stamp indicative of a reception time of the command on the first time base to the monitor camera, said monitor camera executes each of the received commands at an executing time on the second time base corresponding to the reception time indicated by the corresponding time stamp in order of increasing the reception time as indicated by the time stamp.

3. A monitor camera system according to claim 2, wherein data for setting a camera field angle or a camera scene is recorded at the head of said auto-tracing record, and a camera state at the start of the auto-tracing implementation is set on the basis of the setting data.

4. A monitor camera system according to claim 1, wherein said monitor camera achieves 360-degree pan rotation and 180-degree tilt rotation.

5. A monitor camera system according to claim 1, wherein said control means determines a shortest path from a present camera position to a predetermined position specified by the command of said auto-tracing record, and said control means moves the monitor camera through the shortest path in tilt rotation and/or pan rotation to direct the monitor camera toward the predetermined position.

6. A monitor camera system according to claim 5, wherein the monitor camera is rotatable through 360 degrees in the panning directions and through 90 degrees or more in the tilting directions, pieces of image data obtained in the monitor camera in the monitoring operation are stored in an image memory of the monitoring camera in a photographing order, and the pieces of image data are read out from the image memory in an order reverse to the photographing order when the tilt rotation passes through zero degree.

7. An auto-tracing implementation method for use in a monitor camera rotatable in panning directions and in tilting directions, the monitor camera comprising a control means, a timer and a memory, said method comprising the steps of:
receiving a first instruction, transmitted from a controller disposed outside the monitor camera, in said control means of the monitor camera;
starting the timer of said monitor camera on a first time base in response to the first instruction;
receiving a command in said controller;
receiving in the control means both a command received in the controller and a time stamp indicative of a reception time of the command on the first time base from the controller;
making said monitor camera record, in the memory thereof, the command and the time stamp sent from said controller as an auto-tracing record in auto-tracing learning;
when receiving a second instruction for implementation of auto-tracing from said controller, again starting the timer on a second time base in response to the second instruction under control of the control means;
starting auto-tracing implementation under control of the control means in said monitor camera in response to the second instruction;
reading, in said monitor camera, said auto-tracing record from said memory under control of the control means; and
executing, in said monitor camera under control of the control means, said command of said auto-tracing record at an executing time on the second time base corresponding to the reception time indicated by the time stamp of the auto-tracing record to conduct a monitoring operation according to the auto-tracing record, and
wherein, in said monitor camera, at the auto-tracing implementation, interpretation on the time base is made in a different manner from that in said auto-tracing learning such that the step of executing said command of said auto-tracing record includes interpreting a constant recording speed indicated by the timer as a constant reproduction speed different from the constant recording speed by a predetermined rate to implement the auto-tracing, which is learned at the constant recording speed in the auto-tracing learning, at the constant reproduction speed different from that in said auto-tracing learning implementation.

8. An auto-tracing implementation method for use in a monitor camera system according to claim 7, wherein, after completion of said auto-tracing learning, said auto-tracing record stored in said memory is transferred from said monitor camera to said controller so that said controller holds said auto-tracing record, and at the auto-tracing implementation, said auto-tracing record is transferred from said controller to said memory of said monitor camera.

9. An auto-tracing implementation method for use in a monitor camera system according to claim 7, wherein, in said monitor camera, at auto-tracing recording or in auto-tracing reproduction, data representative of an auto-tracing operation state is displayed in a state superimposed on a monitor picture taken by said monitor camera.

10. A monitor camera rotatable in panning directions and in tilting directions, comprising:
a timer;
a memory;
control means for receiving a first instruction from a controller disposed outside the monitor camera, starting the timer on a first time base in response to the first instruction, receiving from the controller both a command received in the controller and a time stamp indicative of a reception time of the command on the first time base, holding an auto-tracing record including the command and the time stamp in the memory in auto-tracing learning, receiving a second instruction from the controller, again starting the timer on a second time base in response to the second instruction, starting auto-tracing implementation in response to the second instruction, reading out the auto-tracing record from the memory, and executing the command of the auto-tracing record in the auto-tracing implementation at an executing time of the second time base corresponding to the reception time indicated by the time stamp of the auto-tracing record to cause the monitor camera to conduct a monitoring operation according to the auto-tracing record,
wherein, at the auto-tracing implementation, the monitor camera interprets a constant recording speed indicated by the timer as a constant reproduction speed different from the constant recording speed by a predetermined rate to implement the auto-tracing, which is learned at the constant recording speed in the auto-tracing learning, at the constant reproduction speed in said auto-tracing implementation.

11. A monitor camera according to claim 10, wherein said control means receives from the controller a plurality of commands and a time stamp indicative of a reception time of each of the commands on the first time base, and the monitor camera executes each of the received commands at an executing time of the second time base corresponding to the reception time indicated by the corresponding time stamp in order of increasing the reception time indicated by the time stamp.

12. A monitor camera according to claim 11, wherein data for setting a camera field angle or a camera scene is recorded at a head of the auto-tracing record, and a camera state at the start of the auto-tracing implementation is set on the basis of the setting data.

13. A monitor camera according to claim 10, wherein the control means controls tilt rotation and pan rotation of the monitor camera to achieve 360-degree pan rotation and 180-degree tilt rotation of the monitor camera.

14. A monitor camera according to claim 10, wherein the control means determines a shortest path from a present camera position to a predetermined position specified by the command of the auto-tracing record, and the control means controls the monitor camera to move through the shortest path in tilt rotation and/or pan rotation and to direct the monitor camera toward the predetermined position.

15. A monitor camera system according to claim 10, wherein the control means controls the monitor camera to rotate the monitor camera through 360 degrees in the panning directions and through 90 degrees or more in the tilting directions, pieces of image data obtained in the monitor camera in the monitoring operation are stored in an image memory of the monitoring camera, in a photographing order, and the pieces of image data are read out from the image memory in an order reverse to the photographing order when the tilt rotation passes through zero degree.

16. A monitor camera system comprising:
   a monitor camera rotatable in panning directions and in tilting directions and having control means, a timer and a memory; and
   a controller, disposed outside said monitor camera, for controlling said monitor camera,
   wherein said control means of the monitor camera receives a first instruction from said controller,
   said control means starts the timer on a first time base in response to the first instruction,
   said controller receives a command and sends the command and a time stamp indicative of a reception time of the command on the first time base to the control means of the monitor camera,
   said control means holds an auto-tracing record including the command and the time stamp sent from said controller in the memory in auto-tracing learning,
   said control means receives a second instruction from said controller,
   said control means again starts the timer on a second time base in response to the second instruction, starts auto-tracing implementation in response to the second instruction, reads out the auto-tracing record from the memory without control of said controller, and executes the command of said auto-tracing record in the auto-tracing implementation at an executing time of the second time base corresponding to the reception time indicated by the time stamp of the auto-tracing record to cause the monitor camera to conduct a monitoring operation according to the auto-tracing record without control of said controller, and
   said control means determines a shortest path from a present camera position to a predetermined position specified by the command of said auto-tracing record, and said control means moves the monitor camera through the shortest path in tilt rotation and/or pan rotation to direct the monitor camera toward the predetermined position.

17. A monitor camera rotatable in panning directions and in tilting directions, comprising:
   a timer;
   a memory;
   control means for receiving a first instruction from a controller disposed outside the monitor camera, starting the timer on a first time base in response to the first instruction, receiving from the controller both a command received in the controller and a time stamp indicative of a reception time of the command on the first time base, holding an auto-tracing record including the command and the time stamp in the memory in auto-tracing learning, receiving a second instruction from the controller, again starting the timer on a second time base in response to the second instruction, starting auto-tracing implementation in response to the second instruction, reading out the auto-tracing record from the memory, and executing the command of the auto-tracing record in the auto-tracing implementation at an executing time of the second time base corresponding to the reception time indicated by the time stamp of the auto-tracing record to cause the monitor camera to conduct a monitoring operation according to the auto-tracing record,
   wherein the control means determines a shortest path from a present camera position to a predetermined position specified by the command of the auto-tracing record, and the control means controls the monitor camera to move through the shortest path in tilt rotation and/or pan rotation and to direct the monitor camera toward the predetermined position.

18. A monitor camera rotatable in panning directions and in tilting directions, comprising:
   a timer;
   a memory;
   control means for receiving a first instruction from a controller disposed outside the monitor camera, starting the timer on a first time base in response to the first instruction, receiving from the controller both a command received in the controller and a time stamp indicative of a reception time of the command on the first time base, holding an auto-tracing record including the command and the time stamp in the memory in auto-tracing learning, receiving a second instruction from the controller, again starting the timer on a second time base in response to the second instruction, starting auto-tracing implementation in response to the second instruction, reading out the auto-tracing record from the memory, and executing the command of the auto-tracing record in the auto-tracing implementation at an executing time of the second time base corresponding to the reception time indicated by the time stamp of the auto-tracing record to cause the monitor camera to conduct a monitoring operation according to the auto-tracing record,
   wherein the control means controls the monitor camera to rotate the monitor camera through 360 degrees in the panning directions and through 90 degrees or more in the tilting directions, pieces of image data obtained in the monitor camera in the monitoring operation are stored in an image memory of the monitoring camera in a photographing order, and the pieces of image data are read out from the image memory in an order reverse to the photographing order when the tilt rotation passes through zero degree.

* * * * *